US011993529B2

(12) United States Patent
Dus et al.

(10) Patent No.: US 11,993,529 B2
(45) Date of Patent: May 28, 2024

(54) COMBINED WATER FILTRATION SYSTEM FOR ENHANCING DRINKING WATER PROPERTIES FOR HUMAN HEALTH

(71) Applicants: Ivan Dus, Muggia (IT); Daniel Hill, Neustadt (DE)

(72) Inventors: Ivan Dus, Muggia (IT); Daniel Hill, Neustadt (DE)

(73) Assignee: AQUIVIO INC., Claymont, DE (US)

( * ) Notice: Subject to any disclaimer, the term of this patent is extended or adjusted under 35 U.S.C. 154(b) by 398 days.

(21) Appl. No.: 17/415,769

(22) PCT Filed: Jan. 9, 2020

(86) PCT No.: PCT/EP2020/050434
§ 371 (c)(1),
(2) Date: Jun. 18, 2021

(87) PCT Pub. No.: WO2020/148157
PCT Pub. Date: Jul. 23, 2020

(65) Prior Publication Data
US 2022/0073397 A1  Mar. 10, 2022

(30) Foreign Application Priority Data
Jan. 15, 2019  (DE) .................. 10 2019 000 263.6

(51) Int. Cl.
*C02F 9/20* (2023.01)
*C02F 1/00* (2023.01)
(Continued)

(52) U.S. Cl.
CPC .............. *C02F 9/20* (2023.01); *C02F 1/003* (2013.01); *C02F 1/283* (2013.01); *C02F 1/30* (2013.01);
(Continued)

(58) Field of Classification Search
None
See application file for complete search history.

(56) References Cited

U.S. PATENT DOCUMENTS

2008/0169232 A1  7/2008  Lee
2018/0208490 A1*  7/2018  Han ..................... C02F 1/687

FOREIGN PATENT DOCUMENTS

DE       29812905 U1    11/1998
DE    202011101386 U1    8/2011
(Continued)

OTHER PUBLICATIONS

Sharma et all., "Biodegradable Magnesium Alloys: A Review of Material Development and Applications," J Biomim Biomater Tissue Eng. Feb. 3, 2012; 12: 25-39 (Year: 2012).*

*Primary Examiner* — Krishnan S Menon
(74) *Attorney, Agent, or Firm* — Dickinson Wright PLLC

(57) ABSTRACT

A water filtration system for producing filtrated drinking water having increased persistence of free hydrogen, pH and ORP level, includes a pre-filtration device having an inlet terminal configured for being connected with a water source and an outlet terminal; the water filtration system being characterized in further comprising a far-Infrared, fIR, filtration device having an inlet terminal in connection with the outlet terminal of the pre-filtration device and an outlet terminal; and an elemental hydrogen releasing device having an inlet terminal in connection with the outlet terminal of the fIR filtration device and an outlet terminal, the elemental hydrogen releasing device configured for utilizing a reaction between elemental magnesium, Mg, or a magnesium mineral and water flowing there through and configured for releasing free hydrogen and $Mg^{2+}$ ions to water flowing there through with a $Mg^{2+}$ release rate in the range from 20 to 40 mg/l of $Mg^{2+}$ ions.

17 Claims, 5 Drawing Sheets

(51) Int. Cl.
*C02F 1/28* (2023.01)
*C02F 1/30* (2023.01)
*C02F 1/44* (2023.01)
*C02F 1/48* (2023.01)
*C02F 1/68* (2023.01)
*C02F 103/02* (2006.01)

(52) U.S. Cl.
CPC .............. *C02F 1/444* (2013.01); *C02F 1/481* (2013.01); *C02F 1/688* (2013.01); *C02F 2103/026* (2013.01); *C02F 2201/006* (2013.01); *C02F 2209/04* (2013.01); *C02F 2209/06* (2013.01); *C02F 2303/04* (2013.01)

(56) References Cited

FOREIGN PATENT DOCUMENTS

| | | |
|---|---|---|
| DE | 202017006490 U1 | 1/2018 |
| DE | 202018105167 U1 | 9/2018 |
| KR | 20120124991 A | 11/2012 |
| KR | 101800137 B1 | 11/2017 |
| KR | 20170130923 A | 11/2017 |
| TW | M558650 U | 4/2018 |

\* cited by examiner

COMBINED WATER FILTRATION SYSTEM FOR ENHANCING DRINKING WATER PROPERTIES FOR HUMAN HEALTH

CROSS-REFERENCE TO RELATED APPLICATIONS

This application is a U.S. National Stage of International Application No. PCT/EP2020/050434, filed on Jan. 9, 2020, which claims the benefit and priority of German patent application DE 10 2019 000 263.6 filed on Jan. 15, 2019, the entire contents of which are incorporated herein by reference.

I. TECHNICAL FILED

The present invention relates to water filtration system providing drinking water with enhanced properties for human health. Particularly, the filtration system provides drinking water having free hydrogen concentrations particularly healthy for the human body while also enhancing the long term stability of the hydrogen concentration.

II. DESCRIPTION OF THE RELATED ART

In general, access to fresh drinking water is essential for human beings and nearly all centers of early human culture developed in close vicinity to rives or lakes providing a source for drinking water. With the development of well construction, the human species was able to extend its influence to regions with less advantageous water supply. However, contamination of ground water sources tapped by wells as well as increasing pollution of rivers and lakes by the human species itself increased the demand for methods of effectively improving the drinking water quality. Early water filtration systems often utilized combined particle filtration, e.g. using sand or cloth, and an active filtration stage, e.g. using activated carbon. These systems are still broadly applied nowadays and will be due to its simple construction and easily available resources.

However, recent research results indicate that drinking water properties may not only be negatively influenced by biological and/or chemical contamination but also strongly depending on very basic characteristics of the water per se. For example, there are several methods for improving water physical and chemical properties such as alkalinity, negative Reduction potential (oxidation/reduction potential ORP) levels, free Hydrogen content, water molecular restructuring such as increasing of $OH^-$ and $H_3O_2^-$ ions and more. There are many different methods to change water properties but usually those systems are capable of modifying only few parameters of the water. Another problem is that those changes are very liable and last for a very short time inside the water.

The most broadly applied principle for modifying the chemical characteristics of drinking water is electrolysis. Such systems have sufficient efficiency for short termed applications. For example, recent studies, e.g. L. Bordoni ET AL "Positive effect of an electrolyzed reduced water on gut permeability, fecal microbiota and liver in an animal model of Parkinson's disease" further indicate possible positive effects of "functional drinking water" having antioxidant properties on individuals afflicted with the Parkinson's disease. However, problems with overheating of the electric components may occur. Further, such applications are always dependent on a designated power supply while the whole system is fault-prone due to failing electric components of the system.

In view of such issues U.S. Pat. No. 7,658,845 B2 discloses a bio water purifier which aims to improve drinking water properties by changing the water to weak alkali drinker. The purifier comprises a sediment filter removing rust and floating matters in the water, a precarbon filter removing chlorine and impurities in the water, a ceramic material tube improving the water molecule, maximizing movement of the water molecule and making weak alkali water by radiating far infrared ray, a silver carbon filter removing odor and bacteria in the water, and a ceramic filter removing various harmful matters in the water.

DE 20 2017 006 490 U1 relates to a device for producing a healthy water that can neutralize the radicals and has an antioxidant activity. This document combines filtration stages containing a mixture of energetic ceramic stones and hydrogen molecule mineral stones which convert the incoming drinking water to be weakly alkaline, having a high negative potential ("Reduction potential" ORP-500~800 mV) and a high hydration of hydrogen molecules (over 1000 Pbb).

The inventors of the present invention have found that the above described prior art has at least two disadvantages. First, the generated antioxidant properties in the treated water are volatile and particularly the stability of free hydrogen molecules in the treated water is low. Thus, even though the freshly treated water may have certain antioxidant properties, such characteristics of the water vanish quickly and treated water, even if stored under optimal conditions, soon loses the desired effects on the human body.

Secondly, it was found that the amount of negative potential and hydrogen saturation disclosed in the prior art has negative impact on the human body. The suggested values of negative potential, ORP, of 500-800 mV and the content of free hydrogen of over 1,000 ppb are far too high in their reducing effect and potentially cause a shift of intestinal microbiome and increasing the population of bacteria of the desulfovibrio genus, a bacterium that is sulfates into Sulphites, in this particular case H2S (Hydrogen sulfide), as investigated in the research "Protection with Electrolyzed Water on Gut Microbiota in Rats exposed to Permethrin during postnatal development" of the "Journal of Nutrigenetics and Nutrigeonomics, while only moderate reductive abilities of less than 800 ppm promote proliferation of bacterial families that have anti-inflammatory action.

Departing from the above findings, the inventors have managed to develop a controlled releasing system in a technical water filtration cartridge in order to have the treated water contain no more than 800 ppb, preferably no more than 400 ppb in average of free hydrogen with a pH varying from 8.7 to 10.5. Simple tap water treated using such water filtration cartridge further showed increased stability of ORP, pH, and particularly free hydrogen level.

III. SUMMARY OF THE INVENTION

The present invention is provided by the appended claims. The following disclosure serves a better understanding of the present invention. Accordingly, one aspect of the present disclosure provides a water filtration system for producing filtrated drinking water having increased persistence of free hydrogen, pH and ORP level. The water filtration system comprises a pre-filtration device having an inlet terminal configured for being connected with a water source and an outlet terminal. The water filtration further comprises a far-Infrared, fIR, filtration device having an inlet terminal in connection with the outlet terminal of the pre-filtration device and an outlet terminal and an elemental hydrogen releasing device having an inlet terminal in connection with the outlet terminal of the fIR filtration device and an outlet terminal. The elemental hydrogen releasing device is configured for utilizing a reaction between elemental magnesium, Mg, or a magnesium mineral and water flowing there through and being configured for releasing free hydrogen and $Mg^{2+}$ ions to water flowing there through on basis of the reaction in equation (1): $2\ H_2O+Mg \rightarrow Mg^{2+}+2\ OH^-+H_2$; with a $Mg^{2+}$ release rate in the range from 20 to 40 mg/l of $Mg^{2+}$ ions.

According to the above aspect, the water filtration system provides a unique solution by combining a fIR cartridge filter and a free hydrogen $H_2$ releasing cartridge based on the reaction of the water with pure magnesium wisely released into the water. This combination is capable of stabilizing a durable pH for several days and weeks and decreasing in $H_2$ and —ORP (oxidation/reduction potential) values loss rate due to recombination if compared to other water ionizing systems. The inventors consider this is due to the presence of more stable negative ions into the water as the $H_3O_2^-$ ions.

Further, the $Mg^{2+}$ release rate in the range from 20 to 40 mg/l of $Mg^{2+}$ ions into common tap water (temperature between 4° C. and 26° C., pH between 6.5 and 8.5, and flow rate between 1.5-3.5 l/min) results in water having a free hydrogen concentration of between 100 and less than 800 pbb (parts per billion) of $H_2$, preferably between 200 and 600 pbb, and more preferably between 300 and 550 pbb. These concentrations of free hydrogen in drinking water have recently been found to be particularly beneficial for human health.

In a further aspect of the present disclosure, in the above water filtration system different filtration devices may physically distinct filtration devices contained in a single filtration cartridge. The combination of different filtration stages as physically distinct units, e.g. in different housings, allows for modularly combining and replacing spent filtration stages without the need of replacing the entire system which reduces costs and waste of material. The combination in one single filtration cartridge improves handling of the system for the user and protects the casings, optional valves, and connection lines from the environment, e.g. from dust, high temperature fluctuations or water damage due to leaks.

In a further aspect of the present disclosure, in the above water filtration system, the fIR filtration device is configured to emit far Infrared energy having a wavelength in the range from 4 μm to 14 μm. Even though the theoretic background is not yet fully understood, the inventors assume that the minerals and their energetic emission in the range from 4 μm to 14 μm are able to create a certain molecular order of the water.

In a further aspect of the present disclosure, in the above water filtration system, the fIR filtration device may comprise a first magnet tube which is made of permanent magnets whose N pole or S pole are arranged at upper or lower portion, respectively, and the water flows between the permanent magnets and a second magnet tube which is made of permanent magnets whose N pole or S pole are arranged at upper or lower portion, respectively. Such magnetic portions serve facilitating the effects of the fIR minerals in the fIR filtration device.

In a further aspect of the present disclosure, in the above water filtration system, the fIR filtration device comprises a ceramic material tube in which different material layers are stacked. The material layers comprise a layer of a plurality of bio ceramic balls made of serpentinite hornblende; a layer of a plurality of tourmalin ceramic balls made by firing tourmalin at high temperature; a layer of a plurality of alumina ceramic balls; a layer of a plurality of natural black jades; a layer of a plurality of sericite ceramic balls made by firing rough sericite at high temperature; a layer of a plurality of bio macsumsuk ceramic balls made of rough macsumsuk ore, preferably comprising elvan and amphibole; and a layer of a plurality of antibiotic ceramic balls. The above configurations was found to be particularly suitable for the application of the present disclosure but should not be construed limiting the disclosure but merely as a preferred example of the disclosure.

In a further aspect of the present disclosure, in the above water filtration system the diameter of the bio ceramic balls is 2.5-4 mm; the diameter of the tourmalin ceramic balls is 2-3.5 mm; the diameter of the alumina ceramic balls is 2.5-3.5 mm; the diameter of the natural black jades is 6-8 mm; the diameter of the sericite ceramic balls is 2.5-3.5 mm; the diameter of the bio macsumsuk ceramic balls is 2.5-3.5 mm; and the diameter of the antibiotic ceramic balls is 4-6 mm. The above indicated size ranges of the mineral balls in the fIR filtration device were found to be particularly suitable for the application of the present disclosure but should not be construed limiting the disclosure but merely as a preferred example of the disclosure.

In a further aspect of the present disclosure, in the above water filtration system, the ceramic material tube comprises respectively in % by volume:

5% of the first magnet tube, 10% of the bio ceramic balls, 20% of the tourmalin ceramic balls, 10% of the alumina ceramic balls, 15% of the natural black jades, 10% of the sericite ceramic balls, 15% of the bio macsumsuk ceramic balls, 10% of the antibiotic ceramic balls, 5% of and the second magnet tube. The above indicated respective volume ranges of the mineral balls in the fIR filtration device were found to be particularly suitable for the application of the present disclosure but should not be construed limiting the disclosure but merely as a preferred example of the disclosure.

In a further aspect of the present disclosure, the above water filtration system further comprises an ultrafiltration device having an inlet terminal connected to the outlet terminal of the fIR filtration device and an outlet terminal connected to the inlet terminal of the elemental hydrogen releasing device. The ultrafiltration device serves for removing residual contents in the tap water flowing through the system and also particles which may have been flushed out of the fIR filtration device. Thus, the water entering the Mg stage, i.e. the hydrogen releasing device, is sufficiently clean to prevent unwanted reactions with the Mg or other compounds contained therein and to allow for a stable hydrogen release.

In a further aspect of the present disclosure, in the above water filtration system, the ultrafiltration device has a pore size in the range from 0.001 μm to 0.1 μm which has proven as particularly suitable for the implementation of the present disclosure.

In a further aspect of the present disclosure, in the above water filtration system, the pre-filtration device has a pore size in the range from 0.05 μm to 3 μm which has proven as particularly suitable for the implementation of the present disclosure.

In a further aspect of the present disclosure, the water filtration system further comprises at least one inline carbon filter device and/or at least one carbon block filter arranged between two neighboring filtration devices of the system, preferably between the pre-filtration device and the fIR filtration device and/or the ultrafiltration device and the elemental hydrogen releasing device. Active carbon stages may serve for removing residual organic compounds or toxic compounds which may be contained in the source tap water. Thus, carbon stages may provide an even healthier and clean drinking water. Further, the particularly preferred combination of ultrafiltration device and active carbon device before the Mg stage (hydrogen release device) reduced contents in the water which may recombine with free hydrogen thus further increasing the lifetime of free hydrogen in the resulting water.

In a further aspect of the present disclosure, the water filtration system further comprises at least one check valve arranged between two neighboring filtration to prevent water from flowing backwards through the water filtration system. It is preferable that water flows through the filtration system in only one direction which may be effectively accomplished using one or more check valves. Most preferably positions of such valves are before the hydrogen release device and after the pre filtration device. Further, it may be desirable to provide at least the hydrogen release device with means for emptying the same from water when no water is supplied to the system, e.g. a valve opened when no water flow is detected combined with a small auxiliary reservoir below the hydrogen release stage to accommodate water flowing from the hydrogen release stage due to gravity. Thus, water is prevented from residing in the hydrogen stage when not in use which may increase the lifetime of the Mg balls or Mg minerals contained therein.

In a further aspect of the present disclosure, in the above water filtration system, the elemental hydrogen releasing device comprises a filter casing having a volume from 100 ml to 600 ml, preferably from 200 ml to 380 ml. Such volumes are sufficient to achieve the desired free hydrogen levels in the water. The elemental hydrogen releasing device further comprises a plurality of elemental Mg or Mg alloy units having an active surface in the range from 300 $cm^2$ to 50,000 $cm^2$, preferably 2,000 $cm^2$ to 45,000 $cm^2$, and more preferably from 5,000 $cm^2$ to 30,000 $cm^2$. These reactive surfaces were found sufficient to arrive at the desired hydrogen levels in the water. However, these values are only preferable examples and should not be construed limiting. For example, Mg units having less content of elemental Mg may require higher reactive surfaces while compounds using further hydrogen releasing compounds, e.g. small amounts of elemental sodium, may reduce the required reactive surface. The elemental hydrogen releasing device further comprises a reactive volume, i.e. the interspace volume of the filter casing not occupied by the volume of the plurality of elemental Mg or Mg alloy units, in the range from 10 ml to 120 ml, preferably from 30 ml to 75 ml. Said volume is filled with water during use and is required to give the water enough time to react with the release units (i.e. the plurality of elemental Mg or Mg alloy units). The required reactive volume is further dependent on water temperature, water flow volume and water composition (particularly pH). However, the above indicated values for the reactive volume ranges have been found sufficient for normal tap water applications.

In a further aspect of the present disclosure, in the above water filtration system, the elemental hydrogen releasing device comprises an inner tube portion which separates the elemental hydrogen releasing device into an inner column portion and an outer barrel portion, wherein the inner column portion is filled with Mg flakes or Mg alloy flakes having a major axis diameter between 1 mm and 5 mm, a minor axis diameter between 0.3 mm and 2 mm, and a thickness between 0.05 mm and 0.2 mm, and wherein the outer barrel portion is filled with Mg balls or Mg alloy balls having a diameter between 1 mm and 10 mm, preferably between 2 mm and 7 mm. The above configuration provides the elemental hydrogen releasing device with two flow zones, wherein the inner zone, which is usually preferred by water flowing through the system, contains smaller and, regarding flow dynamics, less advantageously shaped units which increases the flow resistance for water through the middle column. The outer portion contains larger units in ball shape which has a less flow resistance. In this way, the water flow is distributed more uniformly through the elemental hydrogen releasing device.

In a further aspect of the present disclosure, in the above water filtration system, the elemental Mg or Mg alloy units are Mg flakes or Mg alloy flakes having a major axis diameter between 1 mm and 5 mm, a minor axis diameter between 0.3 mm and 2 mm, and a thickness between 0.05 mm and 0.2 mm, or the elemental Mg or Mg alloy units are Mg balls or Mg alloy balls having a diameter between 1 mm and 10 mm, preferably between 2 mm and 7 mm. The above indicated shapes and size ranges of the units in the elemental hydrogen releasing device were found to be particularly suitable for the application of the present disclosure but should not be construed limiting the disclosure but merely as a preferred example of the disclosure.

In a further preferred aspect, the entire elemental hydrogen releasing device is filled with only one specific type of Mg mineral units, particularly regarding size, shape and composition of the units. This improves the predictability of the reactiveness of the elemental hydrogen releasing device and thus of the hydrogen release rate.

In a further aspect of the present disclosure, in the above water filtration system, the Mg alloy units contain a Mg alloy having a Mg content of 50%-99.9% by weight, preferably 65%-99.5% by weight which has been proven as suitable Mg contents for the filtration system.

In a further aspect of the present disclosure, in the above water filtration system, the Mg alloy units contain at least one further compound beside Mg, selected form the group, consisting of Ti, Al, Ag, and stainless steel or mixes or alloy thereof. However, it should be understood that further compounds or additives may be contained in the Mg alloy units as long as the Mg content is sufficiently high to achieve the desired hydrogen release rates.

In a further aspect of the present disclosure, in the above water filtration system, the Mg alloy units consist of Mg and one compound selected form the group, consisting of Ti, Al, Ag, and stainless steel.

In a further aspect of the present disclosure, in the above water filtration system, the plurality of elemental Mg or Mg alloy units is embedded in active carbon or accompanied by Granulated active Carbon having dimensions similar to the of the units, preferably balls having a diameter between 1 mm and 10 mm. Additions of active carbon may provide further clarification effects of the water flowing through the system and may further reduce recombination rate of elemental hydrogen in the water (i.e. due to reduced number of available recombination partners).

In a further aspect of the present disclosure, in the above water filtration system, the units completely fill the casing.

The present disclosure is also directed to a water filtration method for generating water having enhanced drinking water properties for human health comprising providing a filtration system according to the above description, connecting the inlet terminal of the pre-filtration device with a water source, and continuously flowing water from the water source through the filtration system. The disclosure is also directed to water obtained by the method.

Accordingly, a combined water filtration treatment method to achieve enhance drinking water properties for human health is provided. The main characteristic is the use of two filter elements, one emitting fIR (far InfraRed) energy and next a second filter cartridge capable of producing free hydrogen (H2) from a magnesium mineral reaction. This combination is capable of producing an excellent drinking water with durable alkaline and antioxidizing properties when compared to electrical water ionizers.

There are several methods for improving water physical and chemical properties such as; alkalinity, negative ORP levels, free Hydrogen content, water molecular restructuring such as increasing of OH$^-$ and $H_3O_2^-$ ions and more. There are many different methods to change water properties but usually those systems are capable of modifying only few parameters of the water. The real problem is that those changes are very liable and last for a very short time inside the water.

The inventors of the present invention were able to find a unique solution by combining a fIR cartridge filter made of bioceramics releasing fIR energy, preferably between 4 to 14 μm wavelength and a free hydrogen ($H_2$) releasing cartridge based on the reaction of the water with pure magnesium wisely released into the water.

The inventors have found that this combination is capable of stabilizing a durable pH for several days and weeks and the decrease of $H_2$ and ORP (Oxidation/Reduction Potential) values happens much slower compared to other water ionizing systems.

While chemical addition of minerals through filtration can influence pH levels and release free hydrogen in an unstable and unbound state into the water, the concentration levels of such decrease rapidly by the natural occurring oxidation of the produced waters environment.

$$2H_2O+Mg \rightarrow Mg^{2+}+2OH^-+H_2$$

Studies on far-infrared influence on water demonstrate improvement in the hydrogen bond properties (Leung T K et. al.: "The influence of Ceramic Far-Infrared Ray (cFIR) Irradiation on Water Hydrogen Bonding and its Related Chemical-physical Properties" Hydrology Current Research, Vol. 5, Issue 3, Aug. 5, 2014).

IV. BRIEF DESCRIPTION OF THE DRAWINGS

V. DETAILED DESCRIPTION OF THE EMBODIMENTS

1. Overall Configuration

In the following description of embodiments of the disclosure, same or similar parts will be indicated using the same reference signs.

Figure 1:
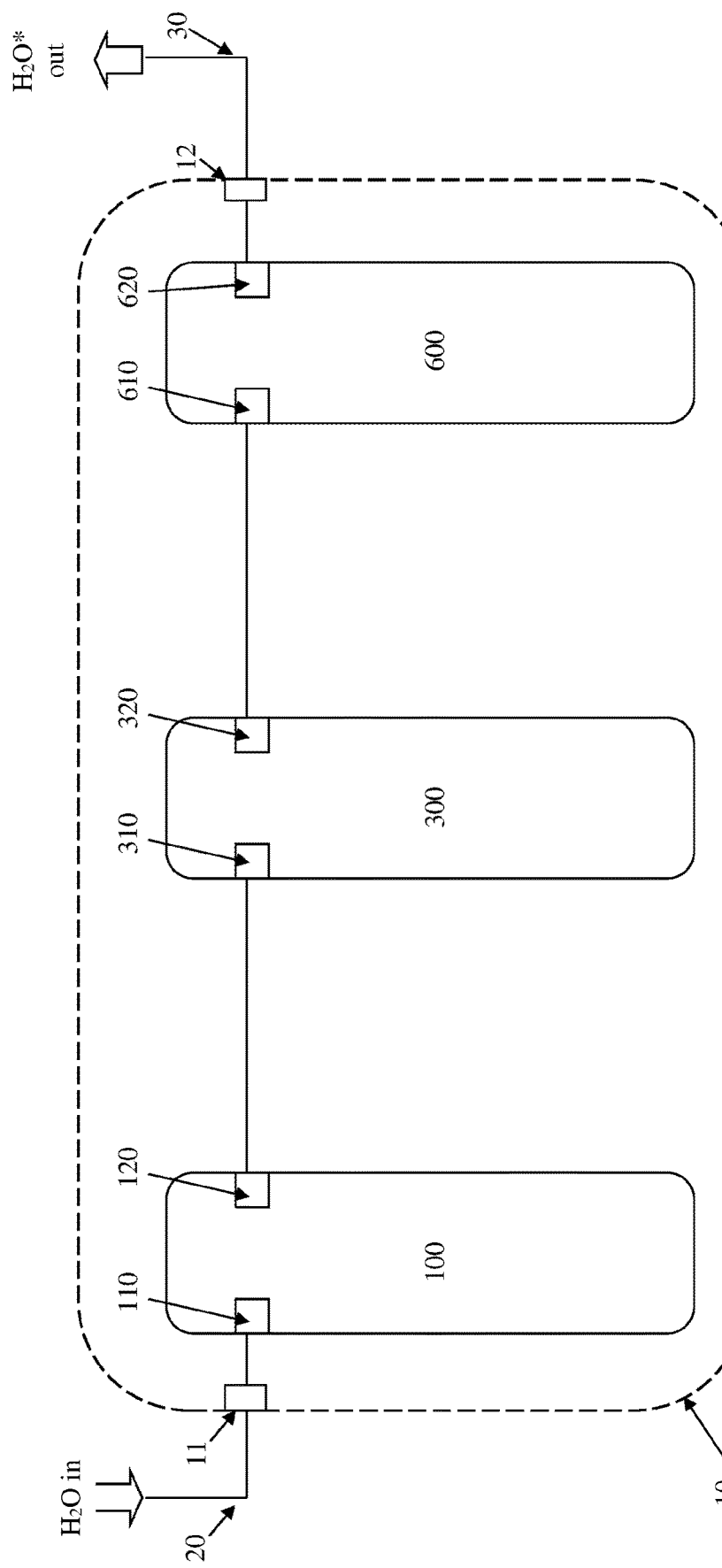
FIG. 1 is a schematic view of a filtration system according to a first embodiment of the present disclosure.
Figure 2:
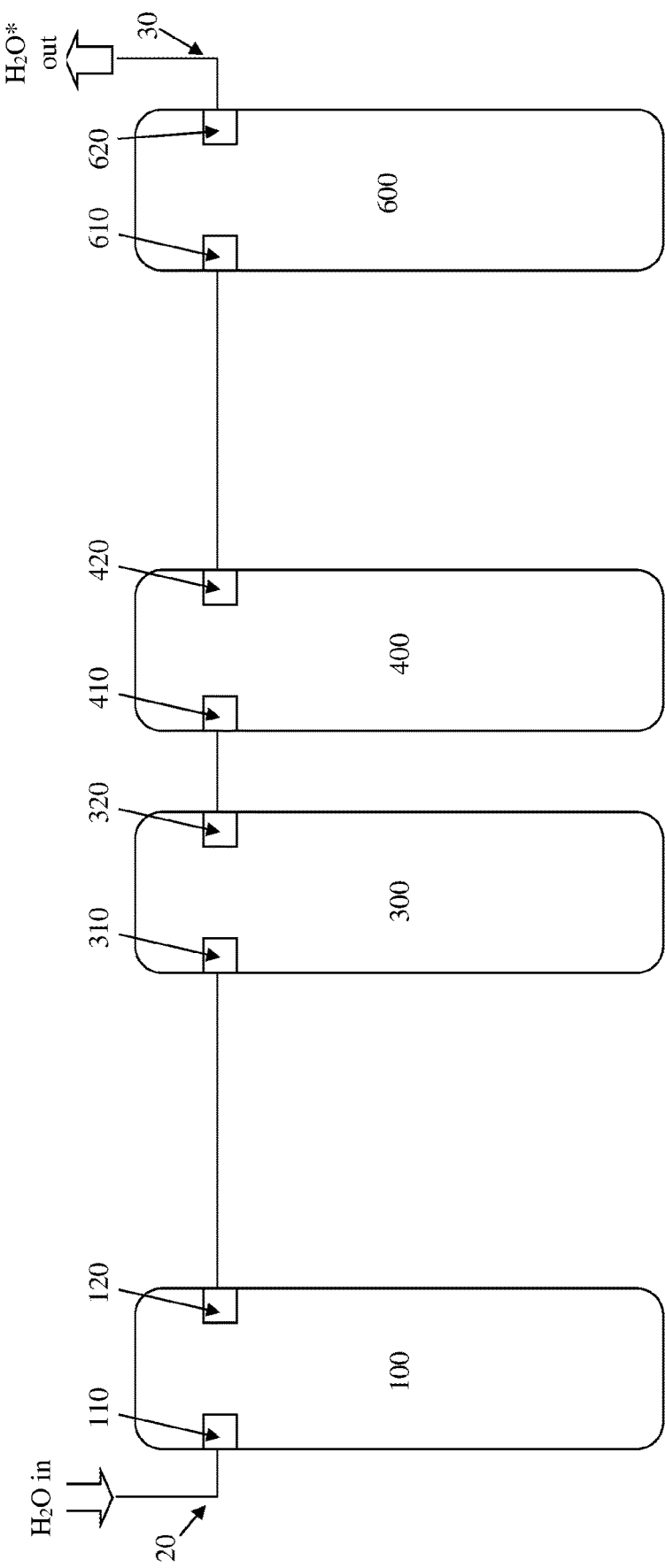
FIG. 2 is a schematic view of a filtration system according to a second embodiment of the present disclosure.
Figure 3:
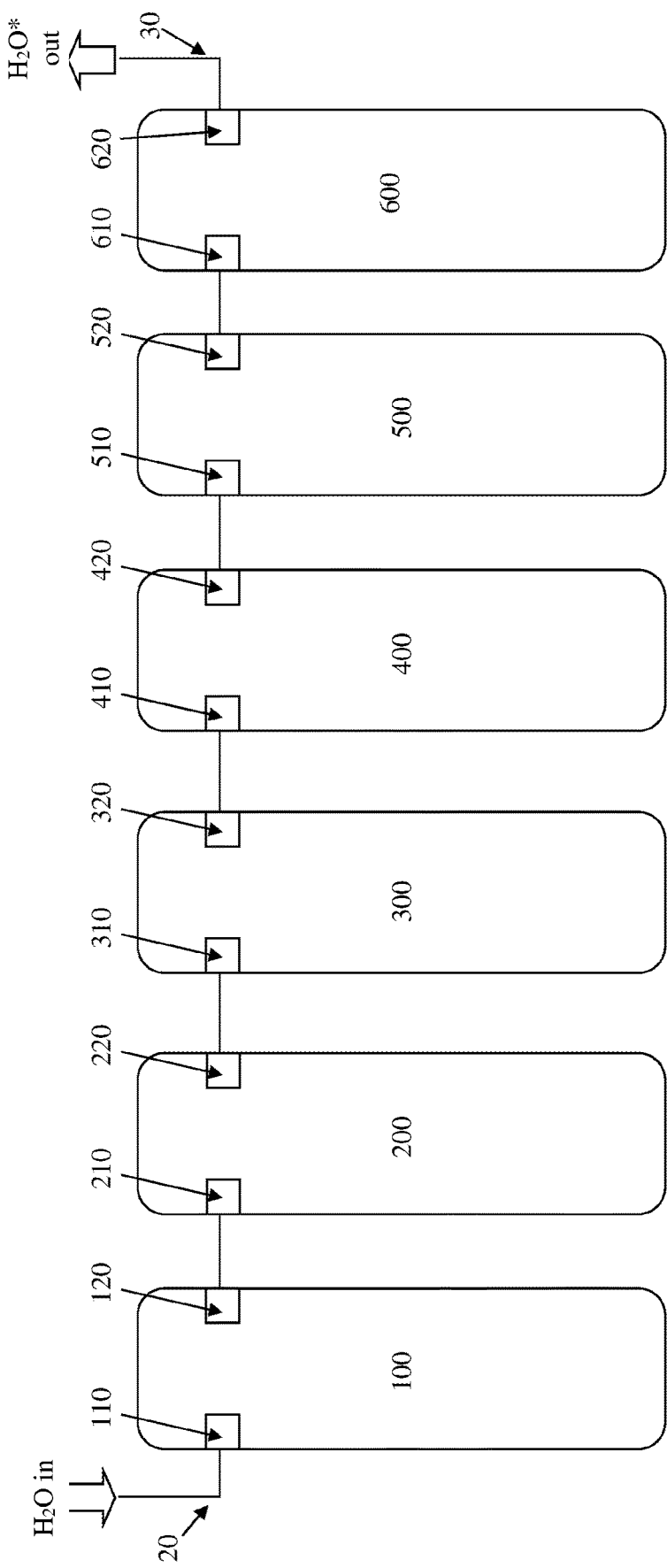
FIG. 3 is a schematic view of a filtration system according to a third embodiment of the present disclosure.

FIG. 1 is a schematic view of a filtration system according to a first embodiment of the present disclosure, FIG. 2 is a schematic view of a filtration system according to a second embodiment of the present disclosure, and FIG. 3 is a schematic view of a filtration system according to a third embodiment of the present disclosure. With reference to FIG. 1-3, first to third embodiments will be now described.

It is clear from FIG. 1-3 that the first embodiment is directed to a fundamental embodiment containing only the parts which are necessary for the present invention to work, i.e. a pre-filtration device (or pre-filtration stage) 100, a far Infra-Red, fIR, device (or fIR stage) 300, and an elemental hydrogen releasing device (also Mg stage or hydrogen device/stage) 600 connected in series. The serial connection is a fluid flow connection using a water line 20 between a source "$H_2O$ in" for water which has basically drinking water quality and a output line 30 to a destination for the treated water "$H_2O$* out". The asterisk shall indicate the altered chemical and structural characteristics of the water output by the filtration system in FIG. 1. The different filtration stages in FIG. 1-3, i.e. stages 100, 200, 300, 400, 500, and 600 may be comprised in a casing 10 which is exemplarily shown only in FIG. 1 as dashed frame 10 but may be implemented in the embodiments of FIGS. 2 and 3 correspondingly.

The different devices or stages 100, 300, and 600 of the first embodiment may be dimensioned and internally structured similarly or differently which will be described later in detail. However, with reference to FIG. 1, all stages (also stages introduced later herein) have in common that they respectively contain an inlet terminal 110, 310, and 610 and an outlet terminal 120, 320, 620. The inlet terminal 110 of the pre-filtration device is configured for being connected with the water source "$H_2O$ in" via line 20. The outlet terminal 120 of the pre-filtration device is configured for connecting to a following stage, which is in FIG. 1 the fIR filtration device 300. The fIR filtration device 300 has the inlet terminal 310 in flow connection with the outlet terminal 120 of the pre-filtration device 100. It should be mentioned that, in the context of the present disclosure, a connection or flow connection may be a direct connection but may also include other devices, filtration stages, valves flow meters etc. there between such that the terms "connected", "connection", and "flow connection" should be interpreted broadly. Further, it should be understood that the position of the terminals 110-610, 120-620 on the respective devices 100-600 should not be construed as limiting and alternative arrangement should be considered as valid embodiments of the disclosure. Furthermore, the position of the devices 100-600 relative to another (e.g. inside the casing 10) may be altered without leaving the scope of the present disclosure. Such change of positions (e.g. a circular arrangement, stacked arrangement, etc.) may become necessary from a designers view planning the power connection of valves, indicators (LEDs), or sensors or positioning actuators for allowing a user to make adjustments on the system parameters like variable flow rate, activating cleaning mode, etc. Important for the implementation of the disclosure is only the sequence of the flow connection of the devices 100-600 and not its relative positions.

The outlet terminal 320 of the fIR filtration device 300 is in flow connection with the inlet terminal 610 of the elemental hydrogen releasing device 600. Finally, the outlet terminal 620 of the hydrogen stage 600 is connected via line 30 to an outlet for the treated water "$H_2O$* out" which usually is a tap or terminal for filling water into a drinking glass, a bottle, a barrel or a device for further treatment, e.g. for adding flavors, sugar free sweeteners, or $CO_2$ to generate sparkling water.

With reference to FIG. 2, the second embodiment is substantially identically to the first embodiment with the difference that an additional ultrafiltration device (or ultrafiltration stage) 400 is introduced between the fIR stage 300 and the hydrogen stage 600 which will be described later in detail. The ultrafiltration device 400 comprises an inlet terminal 410 and an outlet terminal 420 and, corresponding to the first embodiment, the inlet terminal 410 of the ultrafiltration device 400 is connected to the outlet terminal 320 of the fIR device 300 and the outlet terminal 420 of the ultrafiltration device 400 is connected to the inlet terminal 610 of the hydrogen device 600. In one preferred embodiment of the disclosure, the terminals 320 and 410 are directly connected using a water line and, optionally, a check valve (not shown).

With reference to FIG. 3, the third embodiment is substantially identically to the second embodiment with the difference that additional first and second carbon filtration devices (or carbon stages) 200 and 500 are respectively introduced respectively between the pre-filtration device 100 and the fIR stage 300 and between the ultrafiltration device 400 and the hydrogen stage 600 which will be described later in detail. Accordingly, the carbon filtration devices 200 and 500 respectively comprise an inlet terminal 210, 510 and an outlet terminal 220 and 520. Corresponding to the first and second embodiments, as shown in FIG. 3, the inlet terminals 210 and 510 of the carbon filtration devices 200 and 500 are respectively connected with its neighboring outlet terminals 120 and 420. Likewise, the outlet terminals 220 and 520 of the carbon filtration devices 200 and 500 are respectively connected with its neighboring inlet terminals 310 and 610.

For cleaning purposes of the filtration system, with reference to FIG. 3, the filtration system according to the present disclosure may be configured with two release portions (not shown), one arranged in line 20 to allow easy disconnection of the system from source "$H_2O$ in" and one arranged between the fIR stage 300 and ultrafiltration stage 400 to allow easy and convenient disconnection of said stages. When disconnected, a revers flow of water may be initiated to rinse the filtration stages for removing particles which accumulate in the filtration devices over time.

Moreover, in one embodiment, the output line 30 may further contain a further filtration device (not shown) which may be a membrane filter with a pore size between 0.02 and 1.5 μm, i.e. a microfiltration device as may also be used as pre-filtration device 100.

2. Configuration of the Filtration Stages

In the following, characteristics and configuration of the pre-filtration stage 100 (first to third embodiment), the first carbon filtration stage 200 (third embodiment), the ultrafiltration device 400 (second and third embodiment), and the second filtration stage 500 (third embodiment) will be described in detail. However, as a general statement, the exact characteristics of the different stages are not important as long as its basic function and purpose is fulfilled. That is, for the sake of the present disclosure, most important is that the carbon filtration stages provide a sufficient impurity removing functions, that the pre-filtration stage 100 removes particles in the diameter range between 0.02 and 1.5 μm which is commonly denoted as microfiltration, and that the ultrafiltration stage 400 removes particles in the diameter range between 0.002 and 0.1 μm which is commonly denoted as ultrafiltration. The different filtration devices 100, 200, 400, and 500 of the present disclosure not only serve cleaning impurities in the source water "$H_2O$ in" but also particles released in the fIR stage 300. Further, ultrafiltration stage 400 and second carbon filter 500 remove chemical compounds which may serve as recombination partner for the free hydrogen generated in hydrogen stage 600 thus further increasing the long term stability of the chemical composition of the treated water "$H_2O$* out".

The first and second carbon filtration devices may be selected from the group consisting of a carbon block filter, an inline carbon filter, and a carbon substrate or granulate filter. Preferably, the first carbon filtration device 200 is a carbon block filter and the second carbon filtration device is an inline carbon filter. By means of the carbon filters 200 and 500, eventually present chemical contents such as chlorine or volatile organic compounds (VOCs), particles and sediment may be reliably removed.

The pre-filtration device 100 preferably is a membrane filter having a pore size (diameter) between 0.02 and 1.5 μm. Pre-filtration device 100 may operate in cross-flow filtration.

The ultrafiltration device 400 preferably is a membrane filter having a pore size (diameter) between 0.002 and 0.1 μm. Ultrafiltration device 400 may operate in cross-flow filtration.

3. Configuration of the fIR Stage

The configuration and characteristics of the fIR filtration device 300 will now be exemplarily described in detail with reference to FIG. 4. The following description shall be understood as an example only and some of the provided stages 31-39 may be omitted or replaced as needed. Preferably is that the minerals provided in the fIR stage 300 are suitable to emit fIR energy having a wavelength in the range of 4 μm to 14 μm. The emission or radiation of energy in the description was measured by heating the material to certain temperatures (e.g. from 34° C. to 97° C.) and recording the infrared radiation (using commonly known technology) emitted as a temperature dependent spectrum. The fIR radiation ranges indicated herein should preferably as stable as possible over the entire temperature range. Further technical background about measurement methods and effects of fIR on water may be gathered from Leung T K et. al.: "The Influence of Ceramic Far-Infrared Ray (cFIR) Irradiation on Water Hydrogen Bonding and its Related Chemo-physical Properties", Hydrology current Research, Vol. 5, Issue 3, published on Aug. 5, 2014, particularly pages 2-9 therein.

Figure 4:
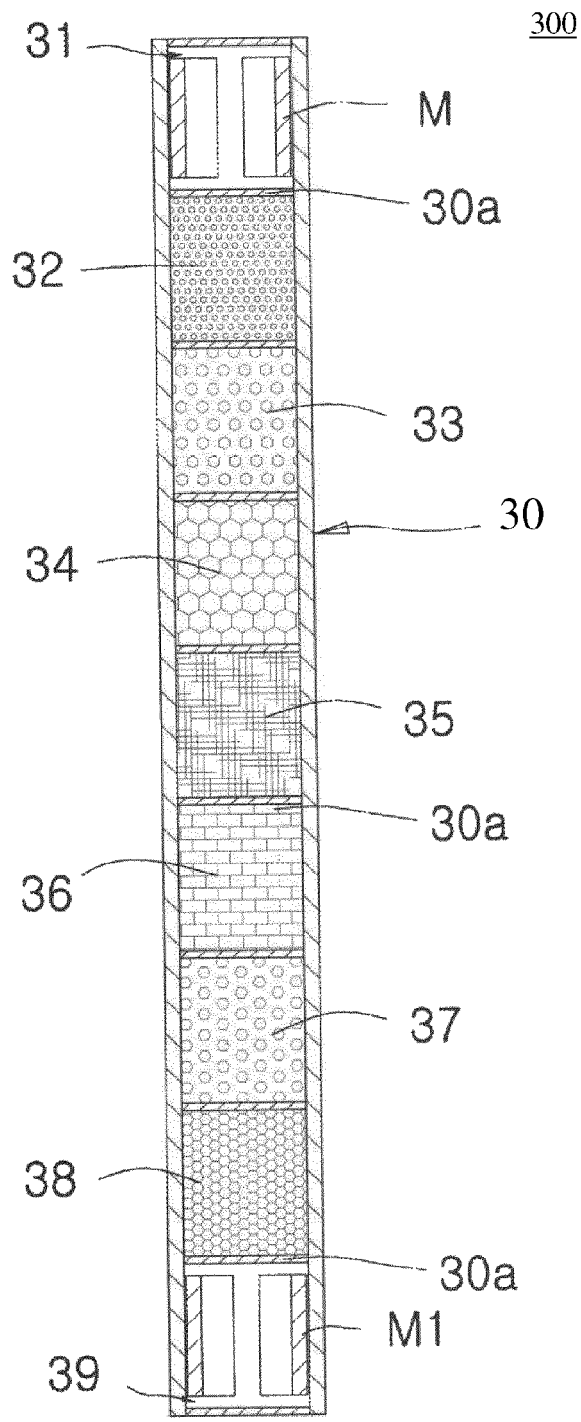
FIG. 4 is a detailed schematic view of a fIR filtration device according to an exemplary embodiment of the present disclosure.

Preferably, as shown in FIG. 4, the fIR filtration device 300 may be provided as a ceramic material tube 30 comprising a first magnet tube 31 which is made of permanent magnets M whose N pole or S pole are arranged at upper or lower portion respectively, and the water flows between the permanent magnets M; bio ceramic balls 32 made of serpentinite hornblende; tourmalin ceramic balls 33 made by firing tourmalin at high temperature; alumina ceramic balls 32; natural black jades 35; sericite ceramic balls 36 having wavelength range which are similar to that of human body and made by firing rough sericiteat at high temperature; bio macsumsuk ceramic balls 37 made of rough macsumsuk; antibiosis ceramic balls 38; and a second magnet tube 39 which is made of permanent magnets M1 whose N pole or S pole are arranged at upper or lower portion.

Preferably, the permanent magnets M, M1 used in the first and second magnet tube 31, 39 have magnetism of about 2000 Gauss.

Preferably, the bio ceramic balls 32 are made of serpentinite hornblende, their diameter is 4-6 mm, and they radiate far infrared ray of 5.6-2.0 μm.

Preferably, the tourmalin ceramic balls 33 are made by firing the tourmalin at 1,000° C.-1,200° C. and their diameter is 2.5-3.5 mm. In one embodiment they generate electricity of 0.06 mA by applying heat, pressure, friction, and so on.

Preferably, the diameter of the alumina ceramic balls 34 is 2.5-3.5 mm.

Preferably, the diameter of the natural black jades 35 is 6-8 mm. Preferably, the sericite ceramic balls 36 are made of rough sericite and their diameter is 2.5-3.5 mm.

Preferably, the bio macsumsuk ceramic balls 37 are made of rough macsumsuk and their diameter is 2.5-3.5 mm.

Preferably, diameter of the antibiosis ceramic balls 38 is 4-6 mm.

Observing the composition ratio of each layer of the ceramic material tube 30 with volume percentage, it preferably comprises 5% of the first magnet tube 31, 10% of the bio ceramic balls 32, 20% of the tourmalin ceramic balls 33, 10% of the alumina ceramic balls 34, 15% of the natural black jades 35, 10% of the sericite ceramic balls 36, 15% of the bio macsumsuk ceramic balls 37, 10% of the antibiosis ceramic balls 38, 5% of and the second magnet tube 39.

A non-woven fabrics filter 30a treated to have antibiosis may be positioned between each layer of the ceramic material tube 30, so that it prevents from mixing each layer and removes bacteria and impurities.

The function of the fIR stage 300 will now be described. While the theoretical background is not yet ensured, Applicant considers the function of fIR stage 300 as follows. While the water flows through each layer of ceramic material tube 30, structure of water molecules may be altered and the water is changed into functional water. The function of each layer of the ceramic material tube 30 is describes below.

While the water flows through the first magnet tube 31, the water is changed to magnetized water by permanent magnet M. Magnetization water is considered to have relatively small cluster which means water molecule group so that the magnetized water is efficiently absorbed in a human body. Also, kinetic energy of oxygen dissolved in the magnetized water is increased and when the oxygen is absorbed in human body, blood oxygen may be increased.

While the water having passed through the first magnetic tube 31 flows through the bio ceramic balls 32, water is activated by far infrared ray which is radiated from the ceramic balls 32 and movement of the water is maximized.

While the water having passed through the bio ceramic balls 32 flows through the tourmalin ceramic balls 33, the water is electrolyzed and could be efficiently absorbed in a human body because the size of the cluster of the water molecule group is reduced and the water is activated.

While the water having passed through the tourmalin ceramic balls 33 flows through the alumina ceramic balls 34, heavy metals in the water are absorbed and removed and structure of water molecule is improved and the water is changed to soft water.

While the water having passed through the alumina ceramic balls 34 flows through the natural black jades 35, water is changed to weak alkali water and terrestrial magnetism is supplemented in the water by natural black jades having magnetism, and iron oxide, calcium oxide, magnesia and the like may be supplemented in the water.

While the water having passed through the natural black jades 35 flows through the sericite ceramic balls 36 the water is changed to weak alkali water.

While the water having passed through sericite ceramic balls 36 flows through the macsumsuk ceramic balls 37, the water is activated in order that the water could be efficiently absorbed in a human body and diuresis may be enhanced.

While the water having passed through the macsumsuk ceramic balls 37 flows through the antibiosis ceramic balls 38, residual heavy metals in the water are absorbed and antibiosis water is enhanced.

When the water having passed through the antibiosis ceramic balls 38 flows through the second magnet tube 39, the water is treated as same as that the water is treated while it flows through the first magnet tube 31. As mentioned of above, bacteria and harmful heavy metals are removed by the ceramic material tube 30.

4. Configuration of the Mg-Stage

In the following, different configurations of the elemental hydrogen device 600 will be exemplarily described. However, it should be noted that the description should not be construed limiting. The elemental hydrogen device 600 may be configured in alternative ways as long as the Mg release rate at common tap water flow rates and flow volumes ranges from 20 to 40 mg/l of $Mg^{2+}$ ions.

Figure 5A:
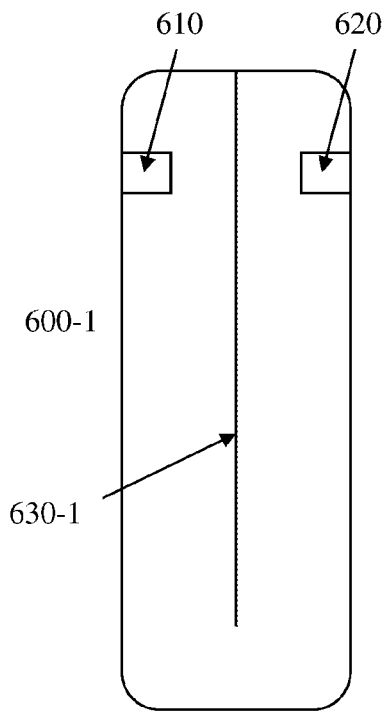
FIG. 5A-5D are detailed schematic views of different modifications of filtration devices on example of an elemental hydrogen releasing device of the present disclosure.
Figure 5B:
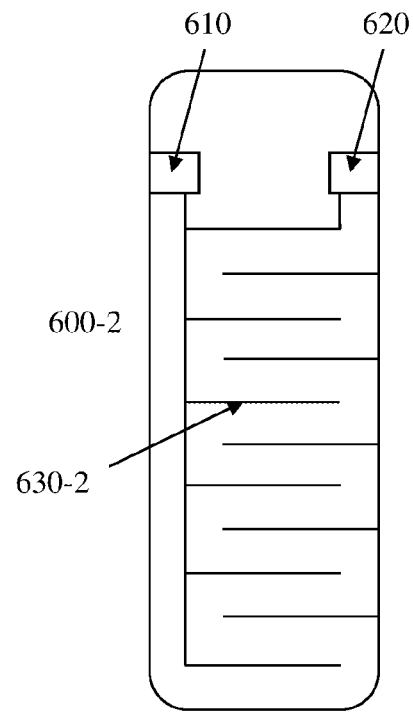

As shown in FIG. 5A-D which are respectively schematic cross-sectional views, the corresponding embodiments of Mg stages 600 mainly serve for increasing the path the water needs to travel within the filtration device. It should be noted that the reference to the Mg stage 600 of the present disclosure is made only exemplarily and the remaining filtration stages 100, 200, 300, 400, and 500 of the water filtration system of the present disclosure may be constructed the same way as shown in FIG. 5A-D and described below. For example, the column-like structure of the fIR-stage 300 shown in FIG. 4 may also be arranged in a labyrinth like arrangement as shown in FIG. 5B. The skilled person will have no problem to combine the different filtration device designs disclosed in FIG. 5A-D to other filtration stages.

In the embodiment of FIG. 5A, the direct water flow from inlet terminal 610 to outlet terminal 620 is deviated by a baffle plate 630-1. Length and position of the baffle plate may be altered to achieve a longer flow path within the casing of the Mg stage 600-1 and also to achieve a more uniform flow in the casing. For example, FIG. 5B shows an embodiment of a Mg stage 600-2 in which the baffle plate 630-2 is bent to receive a labyrinth-like or contorted flow path of water through the Mg stage 600-2.

Figure 5C:
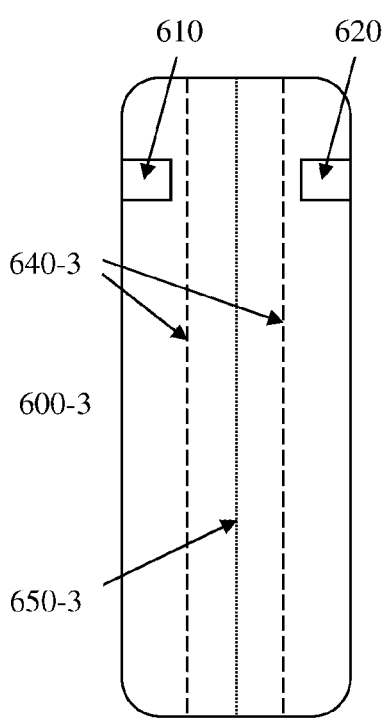

In the embodiment of FIG. 5C, the Mg stage 600-3 is separated by two screen portions 640-3. The room left of the left screen portion 640-3 and right of the right screen portion 640-3 is left empty. The room between the screen portions 640-3 is filled with the elemental Mg units or the Mg alloy units. A central screen portion 650-3 may provide two compartments in the Mg stage 600-3 to allow separate fillings of different Mg units or the Mg alloy unity.

The water entering Mg stage 600-3 of FIG. 5C through inlet terminal 610 enters an empty room (in the figure left of the left screen portion 640-3) and substantially fills it. Then, the water will be forced through the left screen portion 640-3 and through the Mg units or Mg alloy units providing the desired reaction to enrich the water with free hydrogen which then leaves through the right screen portion 640-3, fills up the right empty space until the outlet terminal is reached to leave the Mg stage. The filling on the right side is necessary to provide a static water pressure to void that the water passes only through the bottom part of the inner filled portion between the screen sections 640-3. Further, since the material filled in the inner portion between the screens 640-3 tends to sort in that smaller particles fall down while larger particles stay in the upper area of the Mg stage, the flow resistance in the upper part of the Mg stage 600-3 is smaller than the flow resistance at the bottom thereof. This effect is able to counter the increased water pressure in the bottom of the Mg stage 600-3 (static pressure) which allows a more uniform flow though the Mg stage 600-3.

Figure 5D:
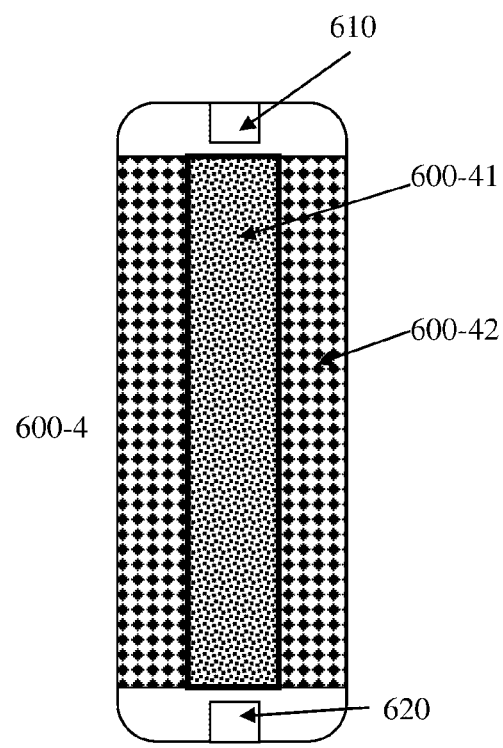

As shown in FIG. 5D, the elemental hydrogen releasing device 600-4 in this embodiment comprises an inner tube portion which separates the elemental hydrogen releasing device 600 into an inner column portion 600-41 and an outer barrel portion 600-42. Preferably, the inner column portion 600-41 of this embodiment is filled with Mg flakes or Mg alloy flakes having a major axis diameter between 1 mm and 5 mm, a minor axis diameter between 0.3 mm and 2 mm, and a thickness between 0.05 mm and 0.2 mm. The outer barrel portion 600-42 of this embodiment is filled with Mg balls or Mg alloy balls having a diameter between 1 mm and 10 mm, preferably between 2 mm and 7 mm. By said configuration, the flow resistance for water through the inner column 600-41 is increase compared to the barrel portion 600-42. Thus, the flow though the device 600-4 may be set more evenly compared to a uniformly filled Mg stage 600. This also results in a more stable wear of the Mg stage and thus, a more stable Mg and hydrogen release rate over the lifetime of the Mg stage 600.

The casings shown in FIG. 5A-5D may be filled with elemental Mg particles (or units) or Mg mineral particles (or units) of any size and shape as long as the required Mg release rate at common tap water flow rates and flow volumes ranging from 20 to 40 mg/l of $Mg^{2+}$ ions are met. Preferably, the particles or units in the Mg stage are uniformly sized and shaped. Preferably, diameters (or for unevenly shaped units, average diameters) range from 0.3 mm to 15 mm, more preferably from 1 mm to 10 mm and most preferably from 2 mm to 8 mm.

Preferably, the elemental Mg or Mg alloy units are Mg flakes or Mg alloy flakes having a major axis diameter between 1 mm and 5 mm, a minor axis diameter between 0.3 mm and 2 mm, and a thickness between 0.05 mm and 0.2 mm. Alternatively, the elemental Mg or Mg alloy units may be Mg balls or Mg alloy balls having a diameter between 1 mm and 10 mm, preferably between 2 mm and 8 mm, most preferably between 3 and 6 mm.

In one preferably embodiment of the water filtration system, the entire elemental hydrogen releasing device is filled with only one specific type of elemental Mg or Mg alloy units, particularly regarding size, shape and composition of the units. The Mg alloy units may contain a Mg alloy having a Mg content of 50%-99.9% by weight, preferably 65%-99.5% by weight. The Mg alloy units may further contain at least one further compound beside Mg, selected form the group, consisting of Ti, Al, Ag, and stainless steel or mixes or alloy thereof. The Mg alloy units of one specific embodiment may even consist of Mg and one compound selected form the group, consisting of Ti, Al, Ag, and stainless steel.

In another embodiment of the disclosure, the plurality of elemental Mg or Mg alloy units may be embedded in active carbon or accompanied by Granulated active Carbon having dimensions similar to the of the units, preferably balls having a diameter between 1 mm and 10 mm.

It may be understood that the shape of the units or particles determines the active surface of the Mg stage, i.e. the sum of surfaces of the units coming into contact with water flowing through stage 600. Preferably active surfaces in the Mg stage range from 300 $cm^2$ to 50,000 $cm^2$, preferably 2,000 $cm^2$ to 45,000 $cm^2$, and more preferably from 5,000 $cm^2$ to 30,000 $cm^2$. The filter casing volume may be set according to present needs but using the above described particle sizes, composition, shapes and active surfaces, the desired Mg release rate is achieved with Mg stage casings having a volume from 100 ml to 600 ml, preferably from 200 ml to 380 ml.

Preferably, the particles or units of the Mg stage fill substantially the whole casing of the stage such that a reactive volume in which the water may flow and reside in the Mg stage is provided only by the interspace volume of the filter casing not occupied by the volume of the plurality of elemental Mg or Mg alloy units. Such reactive volumes are preferably in the range from 10 ml to 120 ml, preferably from 30 ml to 75 ml.

5. EXAMPLES

Generally, the lengthening of the hydrogen bond in the implemented filtration system of the present application creates the condition to form other type of negative ions rather than $OH^-$. Studies have shown that this increased energy on hydrogen bond form another more stable and durable negative ion $H_3O_2^-$. Due to this and other circumstances, combining two devices OR and $H_2$), the inventors have discovered the increased retention rate of free hydrogen preferably useful in regard of regular room temperature conditions, practically occurring in the daily life environment, no refrigeration, not special container needed.

Another currently effective method aiming into a related modification direction by nowadays technologies is water ionization through electrical devices, which affect the pH-levels to desired outcomes and is capable of producing free hydrogen through electrolysis. Table 1 below shows the change of water characteristics "pH", "ORP", and "$H_2$" of water treated by a commonly available electrolytic water treatment filter over 20 minutes of time (Temperature T=20° C.). The values of pH and ORP were measured using "HI2211 Basic" (2019) by Hanna instruments. $H_2$ concentration was measured using a "ENH-2000" (2019) by TRUSTLEX. The table shows the rapid decrease of electrophysically produced water, where values such as pH, H2, and ORP decline minutes after production.

TABLE 1

| Regressive Test of pH, ORP, H2 (ppb) values of electrolyzed water immediately after production | | | |
| --- | --- | --- | --- |
| TIME IN MINUTES | pH | ORP(mV) | H2(pbb) |
| 1 | 10.1 | −450 | 500 |
| 5 | 9.7 | −350 | 410 |
| 10 | 9.5 | −250 | 300 |
| 15 | 9.2 | −200 | 220 |
| 20 | 9 | −180 | 130 |
| AVERAGE OVER 20' | 9.5 | −286 | 312 |

While pH, ORP, and concentration of free hydrogen show desirable values, the electrophysical produced (ionized) negative ORP and hydrogen-rich water loses its characteristics through oxidation in shorter time frames.

The combined treatment of water through in this patent described procedure of far infrared application, mineralization and then following chemo-physical ion-reaction, is creating significantly improved stability in Redox- and free Hydrogen values for the duration of over one week. Table 2 below shows a long term test of water treated with a water filtration system according to the present disclosure. Particularly, a setup according to FIG. 3 was used. The used tap water flow was 2.5 l/min at 15° C. water temperature. Further specifications of the tap water are reflected in table 3 below.

Pre-filtration stage 100 was a commonly available microfiltration device using a membrane with 0.1 μm pore size. Carbon filter 200 was a commonly available carbon block filter.

The fIR device 300 was a tube casing with a volume of 800 ml according to FIG. 4. The fIR filter 300 had two magnet stages 30, 39 and filled there between were balls of different bioceramic minerals produced as described with reference to FIG. 4 (description above), i.e.

bio ceramic balls 32 with diameter 2.5-4 mm;
tourmalin ceramic balls 33 with diameter 2-3.5 mm;
alumina ceramic balls 34 with diameter 2.5-3.5 mm;
natural black jades 35 with diameter 6-8 mm;
sericite ceramic balls 36 with diameter 2.5-3.5 mm;
bio macsumsuk ceramic balls 37 with diameter 2.5-3.5 mm; and
antibiotic ceramic balls 38 with diameter 4-6 mm.

The ceramic material tube contained respectively in % by volume 5% of the first magnet tube (31), 10% of the bio ceramic balls (32), 20% of the tourmalin ceramic balls (33), 10% of the alumina ceramic balls (34), 15% of the natural black jades (35), 10% of the sericite ceramic balls (36), 15% of the bio macsumsuk ceramic balls (37), 10% of the antibiotic ceramic balls (38), 5% of and the second magnet tube (39).

The used ultrafiltration device 400 was a commonly available ultrafiltration membrane filter having a pore size of 0.02 μm (e.g. a TS CLM (T33) Inline post UF 10 inch by Shenzhen Taoshi Co. Ltd.). As carbon filter device 500, an inline carbon filter was used.

The elemental hydrogen releasing device 600 was a tubular body having a volume of 100 ml which was filled with 117 g of elemental Mg flakes having a major diameter of about 3.5 mm, a minor diameter of about 2.5 mm, and a thickness of about 1 mm. In first approximation, each flake had a volume of 0.007 ml and a surface of 0.236 cm$^2$ which results in a total reactive surface of the Mg flakes of 2,240 cm$^2$. The reactive volume of the hydrogen stage 600 in this experiment was approximately 30 ml. In a second experiment, devices 100-500 were maintained as described above while the g stage (hydrogen device) 600 was constructed using a cylindrical housing with inner dimensions of a radius of 4 cm and a height of about 10 cm (effective volume of the cylindrical housing was 500 ml). The cylindrical housing was filled with balls having a diameter of 0.45 cm. The balls were produced from Mg—Ti alloy with 95% Mg and 5% Ti. Accordingly, active surface of the Mg alloy balls was approximately 4,900 cm$^2$. The second experiment also provided sufficient ORP, pH, H$_2$ values and stability over time.

TABLE 2

| REGRESSIVE TEST bottle 759 cc, close at room temperature (20° C.) | | | |
| --- | --- | --- | --- |
| | OPR(mV) | pH | H2(pbb) |
| 23.10.18, - 10.00 am | −250 | 10.1 | 510 |
| 23.10.18 - 2.00 pm | −245 | 10.1 | 510 |
| 24.10.18 - 10.00 am | −245 | 10.1 | 480 |

TABLE 2-continued

| REGRESSIVE TEST bottle 759 cc, close at room temperature (20° C.) | | | |
| --- | --- | --- | --- |
| | OPR(mV) | pH | H2(pbb) |
| 25.10.18 - 10.00 am | −115 | 10.1 | 135 |
| 26.10.18 - 10.00 am | −115 | 10.1 | 123 |
| 28.10.18 - 10.00 am | 80 | 10.0 | 88 |
| 30.10.18 - 10.00 am | 0 | 10.0 | 0 |
| 01.11.18 - 10.00 am | 50 | 10.0 | 0 |
| 05.11.18 - 10.00 am | 80 | 10.0 | 0 |
| 10.11.18 - 10.00 am | 90 | 9.9 | 0 |
| 15.11.18 - 10.00 am | 90 | 9.9 | 0 |
| 20.11.18 - 10.00 am | 90 | 9.6 | 0 |
| 20.12.18 - 10.00 am | 90 | 9.4 | 0 |
| 30.10.18 - 10.00 am | 95 | 9.3 | 0 |

Significant stability was show by the pH value. The total variation over time of pH was 10.1 to 9.3 which may be considered very small variation of pH over 3 months. The combination of fIR produced by bioceramics stage (fIR) and H$_2$ releasing cartridge is capable of increasing the pH to very significant level and to maintain this level for several months. Electric ionized water shows a decrease in pH short after production and sensible loss after few days (table 1).

The filtration system of the present disclosure is based on controlled released of pure magnesium to achieve higher pH and fast available H$_2$ and OH—. Accordingly, it is normal that there is a regression of efficiency in continuous production. The same happens in electric ionizers due to overheating of the power supply working on a DC mode. Only commercial electric ionizers can work for this amount of time while domestic at 20 minutes will experience over heating problem.

Therefore, in our device, even with the limit of regression (decreasing in performance in continuous flow) on the average time and results, the performance still is very efficient. In relation, our study on microbiota, it was important to make sure that the amount if free hydrogen production, H2, would never get into a dangerous production, meaning that ideally, we want to stay on an average below the 400 ppb.

TABLE 3

| Parameters | Tap Water | fIR | fIR + H2 Mg |
| --- | --- | --- | --- |
| Hardness F° | 4.5 | 5 | 10 |
| TDS ppm | 370 | 370 | 410 |
| Conductivity μS/cm | 740 | 740 | 820 |
| Free Chlorine ppm | 0.3 | 0.09 | 0 |
| ORP mV | 480 | 30 | −400 |
| PH | 8.3 | 8.4 | 10.1 |
| Measurable H2 ppb | 0 | 0 | 480 |

The above table 3 deals with the average release of magnesium ions in combination with bioceramic. According to the present disclosure, goal is to obtain and average release between 20 to 40 mg/l of Mg$^{2+}$ in various combination of magnesium salts. Since bioceramics does not release Mg$^{2+}$ the difference in hardness is coming from released Mg$^{2+}$ from ionization of Mg.

As it can be seen in table 3, the bioceramic alone (middle column of table 3) can improve a lots the ORP of the water, due to the effect of fIR on Hydrogen bond, and this is the part that will stay stable over time with a slight increase of pH. The boost in pH and reduced ORP (−ORP) plus free hydrogen, H2, comes from the reaction of water and elemental magnesium.

The combined application according to the present disclosure not only provides users of this drinking water modification method an extended time window for consumption in which the physiological properties of the production water have been optimized at, it also increases the mass-scale application possibilities for these drinking water modification purposes to the general market. Electrical alternative devices not only contain more expensive materials than mechanical filter elements of described type, as well as require higher labor costs for manufacturing and assembly, while always bearing an increased risk of electronical defects and downtime during their use. Not last, electric ionizers have a water waste between 30 to 50% while our patent solution can produce a better and stable result without any waste of water.

The non-electrical module containing both filtration type elements to realize this patent can therefore be implemented or added more conveniently into existing drinking fountains, beverage machines and filtration systems without complications at further decreased technical risk and cost towards nowadays standards. Even more, this special functional water can be combined with organic sugar free, sweeteners free flavors. Those specially formulated flavors will not alter the properties of this functional water and will create a real breakthrough in the drinking industry by providing a unique healthy drink capable of improving hydration and health benefit to human kind and to the environment as well. No more plastic waste, no more pollution from plastic pre and post processing and prime materials. Not more health expenses to treat diseases as consequences of drinking high sugar or sweeteners drink contaminated from plastic particles and chemicals derived from plastic.

At a later time and further investigation, performing scientific research and field studies to understand and optimize the mechanics, gather market feedback and continue developments to improve the effectiveness of the invention by pinpointing ideal far infrared-spectrum and mineral concentrations under multidomestic water supply conditions, also licensing will be considered to be welcome for the inventors.

The purpose of the present disclosure was not simply to combine some sort of bioceramic material with some magnesium to achieve water ionization and alkalinizing. We have been working to realize a unit that can perform under a control system to achieve safe production of ionization especially to protect the microbiota of the water consumer, as shown through our research study.

As shown above, this electrophysically produced water also loses free hydrogen levels at a higher rate than by combined functional filter application of described patent and also loses part of its increased pH value after production. This is due to the instability of Hydrogen bond not able to stabilize the OH⁻ ion in keeping a differential charge in water, reaching a fast-equipotential condition then after changing into an oxidized state showing it by an +ORP (Oxidation Reduction Potential).

Specifically, for drinking purposes the combined application of functional mineral filters causing the release of active hydrogen into water that has previously been exposed to far-infrared radiation, shows an optimized behavior in retaining this free hydrogen and maintaining more stable pH and ORP levels than electrolyzed water. This is considered to be due to the presence of more stable negative ions into the water as the $H_3O_2^-$ ions.

6. INDUSTRIAL APPLICATION

The water filtration system according to the present invention may be installed to tap water sources in private home applications or be implemented in "IQ Beverage stations" for private or office applications, for example.

The obtained special functional water can be combined with organic sugar free, sweeteners free flavors. Such specially formulated flavors may not alter the properties of this functional water and will provide a unique healthy drink capable of improving hydration and health benefit to human kind and to the environment as well.

What is claimed is:

1. A water filtration system for producing filtrated drinking water having increased persistence of free hydrogen, pH and Oxidation-Reduction-Potential (ORP) level, comprising:
a pre-filtration device having an inlet terminal configured for being connected with a water source and an outlet terminal;
the water filtration system being characterized in further comprising:
a far-Infrared (fIR) filtration device having an inlet terminal in connection with the outlet terminal of the pre-filtration device and an outlet terminal; and
an elemental hydrogen releasing device having an inlet terminal in connection with the outlet terminal of the fIR filtration device and an outlet terminal, the elemental hydrogen releasing device being configured for utilizing a reaction between elemental magnesium (Mg) or a magnesium mineral and water flowing there through and being configured for releasing free hydrogen and $Mg^{2+}$ ions to water flowing there through on basis of the reaction in equation (1)

$$2H_2O+Mg \rightarrow Mg^{2+}+2OH^-+H_2 \qquad (1)$$

with a $Mg^{2+}$ release rate in the range from 20 to 40 mg/l of $Mg^{2+}$ ions;
wherein the elemental hydrogen releasing device comprises:
a filter casing having a volume from 80 ml to 600 ml;
a plurality of elemental Mg or Mg alloy units having an active surface in the range from 100 cm² to 30,000 cm²;
a reactive volume in the range from 10 ml to 120 ml;
an inner tube portion which separates the elemental hydrogen releasing device into an inner column portion and an outer barrel portion, wherein the inner column portion is filled with Mg flakes or Mg alloy flakes having a major axis diameter between 1 mm and 5 mm, a minor axis diameter between 0.3 mm and 2 mm, and a thickness between 0.05 mm and 0.2 mm, and wherein the outer barrel portion is filled with Mg balls or Mg alloy balls having a diameter between 1 mm and 10 mm.

2. The water filtration system according to claim 1, wherein the pre-filtration device, the fIR filtration device, and the elemental hydrogen releasing device are physically distinct devices contained in a single filtration cartridge.

3. The water filtration system according to claim 1, wherein the fIR filtration device is configured to emit far Infrared energy having a wavelength in the range from 4 μm to 14 μm.

4. The water filtration system according to claim 1, wherein the fIR filtration device comprises:
a first magnet tube which is made of permanent magnets whose N pole or S pole are arranged at upper or lower portion, respectively, and the water flows between the permanent magnets; and a second magnet tube which is made of permanent magnets whose N pole or S pole are arranged at upper or lower portion, respectively.

5. The water filtration system according to claim 1, further comprising:
an ultrafiltration device having an inlet terminal connected to the outlet terminal of the fIR filtration device and an outlet terminal connected to the inlet terminal of the elemental hydrogen releasing device.

6. The water filtration system according to claim 5, wherein the ultrafiltration device has a pore size in the range from 0.001 μm to 0.1 μm.

7. The water filtration system according to claim 1, wherein the pre-filtration device has a pore size in the range from 0.05 μm to 3 μm.

8. The water filtration system according to claim 1, further comprising:
at least one inline carbon filter device and/or at least one carbon block filter arranged between the pre-filtration device and the fIR filtration device and/or an ultrafiltration device and the elemental hydrogen releasing device.

9. The water filtration system according to claim 1, further comprising:
at least one check valve arranged between two of the pre-filtration device, the fIR filtration device, and the elemental hydrogen releasing device to prevent water from flowing backwards through the water filtration system.

10. The water filtration system according to claim 1, wherein the filter casing has a volume from 100 ml to 380 ml; the plurality of elemental Mg or Mg alloy units have an active surface in the range from 1,000 $cm^2$ to 15,000 $cm^2$; and the reactive volume is in the range from 30 ml to 75 ml.

11. The water filtration system according to claim 10, wherein the Mg balls or Mg alloy balls have a diameter between 2 mm and 7 mm.

12. The water filtration system according to claim 1, wherein the Mg alloy units contain a Mg alloy having a Mg content of 50%-99.9% by weight.

13. The water filtration system according to claim 10, wherein the Mg alloy units contain at least one further compound beside Mg, selected form the group consisting of:
Ti, Al, Ag, and stainless steel or mixes or alloy thereof.

14. The water filtration system according to claim 13, wherein the Mg alloy units consist of Mg and one compound selected form the group consisting of Ti, Al, Ag, and stainless steel.

15. The water filtration system according to claim 1, wherein the plurality of elemental Mg or Mg alloy units is embedded in active carbon or accompanied by Granulated active Carbon having dimensions similar to the Mg balls or Mg alloy balls having a diameter between 1 mm and 10 mm.

16. The water filtration system according to claim 1, wherein the units completely fill the casing such that the active volume is provided only by the interspace volume of the filter casing not occupied by the volume of the plurality of elemental Mg or Mg alloy units, i.e. the interspace between the units.

17. A water filtration method for generating water having enhanced drinking water properties for human health, comprising:
providing a filtration system according to claim 1;
connecting the inlet terminal of the pre-filtration device with a water source; and
continuously flowing water from the water source through the filtration system.

* * * * *